United States Patent
Yang

(10) Patent No.: US 12,119,478 B2
(45) Date of Patent: *Oct. 15, 2024

(54) ACTIVE MATERIAL BALL ELECTRODE LAYER STRUCTURE

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 394 days.

This patent is subject to a terminal disclaimer.

(21) Appl. No.: 16/923,271

(22) Filed: Jul. 8, 2020

(65) Prior Publication Data

US 2021/0043936 A1   Feb. 11, 2021

(30) Foreign Application Priority Data

Aug. 5, 2019 (TW) ................................. 108127695

(51) Int. Cl.
*H01M 4/134* (2010.01)
*H01M 4/131* (2010.01)
(Continued)

(52) U.S. Cl.
CPC ........... *H01M 4/134* (2013.01); *H01M 4/131* (2013.01); *H01M 4/133* (2013.01); *H01M 4/364* (2013.01);
(Continued)

(58) Field of Classification Search
None
See application file for complete search history.

(56) References Cited

U.S. PATENT DOCUMENTS 10,873,078 B2 * 12/2020 Yang ..................... H01M 4/62
11,742,476 B2 * 8/2023 Yang ..................... H01M 4/386
429/217
(Continued)

FOREIGN PATENT DOCUMENTS

CN       102324317 A    1/2012
CN       103534847 A    1/2014
(Continued)

OTHER PUBLICATIONS

Extended European Search Report issued Dec. 11, 2020 in Application No. 20185816.4.
(Continued)

*Primary Examiner* — Laura Weiner
(74) *Attorney, Agent, or Firm* — RABIN & BERDO, P.C.

(57) ABSTRACT

The invention discloses an active material ball electrode layer structure, which mainly includes the active material balls made of the active material particles, a first mixed electrolyte located inside the active material balls, and a second mixed electrolyte located outside the active material balls. The first mixed electrolyte is mainly made of the deformable electrolyte. The second mixed electrolyte is mainly made of the electrolyte with relatively lesser deformation than the deformable electrolyte of the first mixed electrolyte. The invention utilizes the first mixed electrolyte to effectively active material ball reduce the derived problems of the volume change of the active materials. Moreover, the different configuration of the first mixed electrolyte and the second mixed electrolyte inside and outside the active material balls is utilized to reduce the charge transfer resistance. Also, the expansion resistance is provided for the active material balls.

5 Claims, 4 Drawing Sheets

(51) Int. Cl.
*H01M 4/133* (2010.01)
*H01M 4/36* (2006.01)
*H01M 4/62* (2006.01)
*H01M 4/02* (2006.01)

(52) U.S. Cl.
CPC ............ *H01M 4/366* (2013.01); *H01M 4/62* (2013.01); *H01M 4/624* (2013.01); *H01M 2004/021* (2013.01); *H01M 2004/025* (2013.01); *H01M 2004/027* (2013.01); *H01M 4/623* (2013.01); *H01M 2300/0068* (2013.01); *H01M 2300/0071* (2013.01); *H01M 2300/008* (2013.01); *H01M 2300/0082* (2013.01); *H01M 2300/0085* (2013.01); *H01M 2300/0091* (2013.01); *H01M 2300/0094* (2013.01)

(56) References Cited

U.S. PATENT DOCUMENTS

| | | |
|---|---|---|
| 2014/0072875 A1 | 3/2014 | Uchiyama |
| 2014/0087256 A1 | 3/2014 | Li et al. |
| 2015/0194677 A1 | 7/2015 | Jeong et al. |
| 2015/0194678 A1 | 7/2015 | Jeong et al. |
| 2016/0104882 A1 | 4/2016 | Yushin et al. |
| 2017/0077497 A1 | 3/2017 | Ogata et al. |
| 2020/0058921 A1 | 2/2020 | Zheng et al. |
| 2021/0036311 A1 | 2/2021 | Matsumura |

FOREIGN PATENT DOCUMENTS

| | | |
|---|---|---|
| CN | 104904049 A | 9/2015 |
| EP | 3373367 A1 | 9/2018 |
| EP | 3660957 A2 | 6/2020 |
| JP | 2009224239 A | 10/2009 |
| JP | 2014120459 A | 6/2014 |
| KR | 20170033123 A | 3/2017 |
| KR | 1020190044397 A | 4/2019 |
| TW | I508357 B | 11/2015 |
| WO | 2019052572 A1 | 3/2019 |
| WO | 2019065030 A1 | 4/2019 |

OTHER PUBLICATIONS

Extended European Search Report issued Dec. 15, 2020 in Application No. 20185819.8.

* cited by examiner

ACTIVE MATERIAL BALL ELECTRODE LAYER STRUCTURE

CROSS REFERENCES TO RELATED APPLICATIONS

The present application claims priority to Taiwanese Patent Application 108127695 filed in the Taiwanese Patent Office on Aug. 5, 2019, the entire contents of which is being incorporated herein by reference.

BACKGROUND OF THE INVENTION

Field of Invention

The present invention relates to an electrode layer structure, in particular to an active material ball electrode layer structure.

Related Art

The liquid electrolyte is usually used for the existing lithium ion secondary battery as a medium for the lithium ion transport. However, the volatile property of the liquid electrolyte may adversely affect the human body and the environment. Moreover, it is also a great security concern for the battery users due to the flammability of the liquid electrolyte.

Furthermore, one reason for the destabilization of lithium batteries is the greater surface activity of the negative electrode and the higher voltage of the positive electrode. When the liquid electrolyte is directly contacted to the electrodes, the interfaces therebetween is destabilized and the exothermic reaction is occurred to form a passivation layer. These reactions would consume the liquid electrolyte and the lithium ion and generate heat. When a local short circuit occurs, the local temperature rises rapidly. The passivation layer will become unstable and release heat. This exothermic reaction is cumulative to cause the temperature of the whole battery to continue to rise. The one of safety concerns of using a battery is that once the battery temperature is increased to a starting temperature (trigger temp.), the thermal runaway is initiated to cause an ignition or explosion of the battery. That is a major safety issue for using.

In recent years, the solid electrolytes is a focusing research. The ionic conductivity of the solid electrolytes are similar to the ionic conductivity of the liquid electrolytes, without having the properties of evaporating and burning. Also, the interfaces between the solid electrolytes and the surface of active materials are relatively stable, regardless chemically or electrochemically. However, differing from the liquid electrolyte, the contact area between the solid electrolytes with the active materials is quite small, the contact surface is poor, and the charge transfer coefficient is low. So there is a problem that the charge transfer interface resistances of the active materials with the positive and negative electrodes are large. It is adverse for the efficient transmission of lithium ions. Therefore, it is still difficult to completely replace the liquid electrolytes by the solid electrolytes.

Moreover, for the negative electrode materials of the lithium ion batteries, the theoretical volumetric capacity of the conventional graphite carbon negative electrode materials is only 372 mAh/g, which limits the improvement of the energy density of the lithium ion batteries. While the volumetric capacity is up to 4200 mAh/g, silicon is became the focus of current research. However, when elementary silicon is used as a negative electrode, a huge volume change (up to 300%) would be occurred during the charging and discharging processes, which may easily lead to the formation of a void interface between the electrolyte and the elementary silicon to cause the continued decline in electrode performance.

Therefore, how to adapt solid electrolytes efficiently in large amount, while taking into account the improvement of the electrical capacity of the electrode layer, is an urgent problem to be solved in this art.

SUMMARY OF THE INVENTION

It is an objective of this invention to provide an active material ball electrode layer structure to overcome the forgoing shortcomings. The dual-type electrolytes with different percentages or characteristics are utilized. Therefore, the problems of the high resistance of the charge transfer and small contact area, caused by the directly contact of the solid electrolyte and the active material, are eliminated. The amount of organic solvents is reduced, and the safety of the battery is improved.

Also, it is another objective of this invention to provide an active material ball electrode layer structure. The different percentages and characteristics configuration of the electrolytes inside and outside the active material balls is utilized. The void problems caused by the huge volume change of the active materials can be solved by the electrolytes inside of the active material balls, and the expansion resistance can be provided for the active materials by the electrolytes outside of the active material balls.

In order to implement the abovementioned, this invention discloses an active material ball electrode layer structure, which includes a plurality of active material balls and a second mixed electrolyte. The active material ball includes a plurality of active material particles, a first electrically conductive material, a first binder and a first mixed electrolyte. The active material balls and the different characteristics configuration of the first mixed electrolyte and the second mixed electrolyte are utilized. The void problems caused by the huge volume change of the active material particles can be solved by the first mixed electrolyte inside of the active material balls, and the expansion resistance can be provided for the active material balls by the second mixed electrolyte outside of the active material balls. In addition, the problems of the high resistance of the charge transfer and small contact area, caused by the directly contact of the solid electrolyte and the active material, are eliminated. Therefore, the better ion-conduction is achieved with improved safety.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
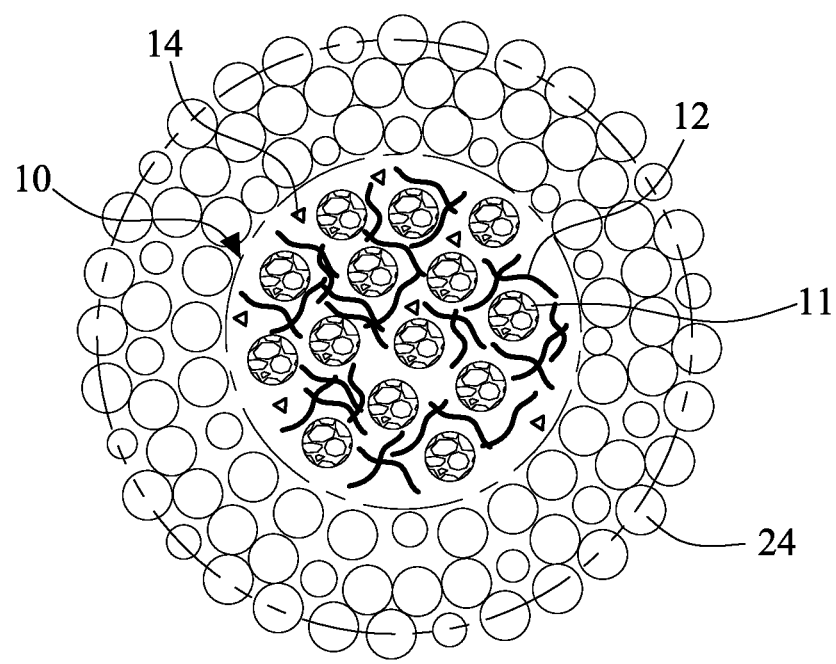
FIG. 1 is a schematic diagram of the active material ball of this invention.

Please refer to FIG. 1, which is a schematic diagram of the active material ball of this invention. As shown, the active material ball 10 is pre-formed as a sphere. The active material ball 10 includes a plurality of first active material particles 11, a first electrically conductive material 12 and a first mixed electrolyte 14. A second mixed electrolyte 24 is located outside the active material ball 10. The average particle diameter D50 of the first active material particles 11 is not greater than 60% of the diameter of the active material ball 10. The volume change of the first active material particles 11 during extraction and insertion reactions is 15% to 400%.

Figure 2:
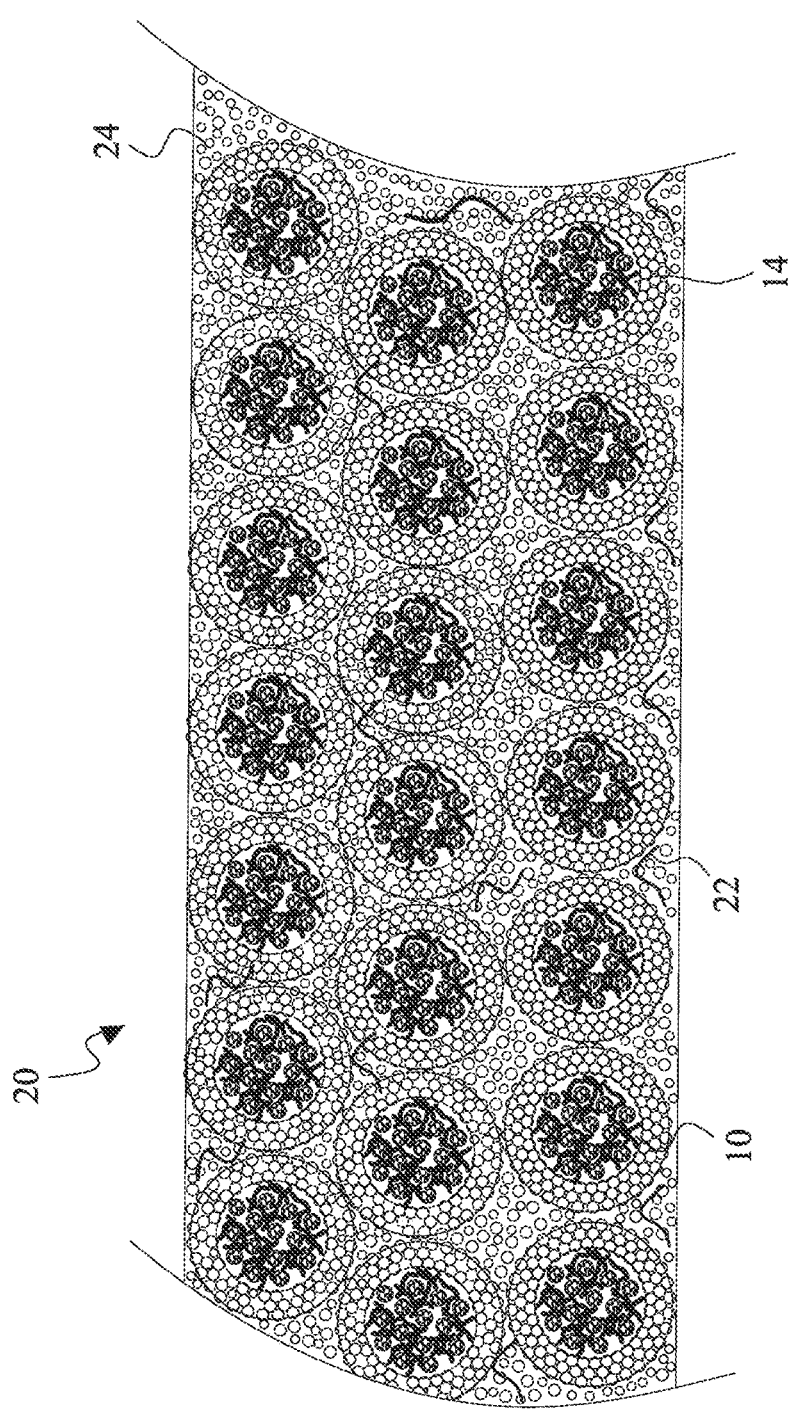
FIG. 2 is a schematic diagram of the active material ball electrode layer structure of this invention.

Please also see FIG. 2, which is a schematic diagram of the active material ball electrode layer structure of this invention. The active material ball electrode layer structure 20 of this invention is composed of the pre-formed active material ball 10. The first mixed electrolyte 14 is located inside the active material ball 10, and the second mixed electrolyte 24 is located outside the active material ball 10. A second electrically conductive material 22 and the second mixed electrolyte 24 are mixed between the active material balls 10, i.e. outside of the active material balls 10. The first mixed electrolyte 14 is mainly composed of a deformable electrolyte, and the second mixed electrolyte 24 is mainly composed of an electrolyte with relatively lesser deformation ability than the deformable electrolyte of the first mixed electrolyte 14. The average particle diameter D50 of the active material ball 10 does not greater than 70% of a thickness of the electrode layer structure 20. The electrolyte with relatively greater deformation is selected from a gel electrolyte, a liquid electrolyte, an ionic liquid, an ionic liquid electrolyte, a soft solid electrolyte or a combination thereof. The soft solid electrolyte is selected from a sulfide-based solid electrolyte, a hydride solid electrolyte, a halide based solid electrolyte, a polymer solid electrolyte or a combination thereof. The polymer solid electrolyte includes a polyethylene oxide (PEO), a polyvinylidene fluoride (PVDF), a polyacrylonitrile (PAN), a polymethylmethacrylate (PMMA) and a polyvinylchloride (PVC).

The sulfide-based solid electrolyte may be the Thio-LISICON, such as $Li_4GeS_4$, $Li_{3.9}Zn_{0.05}GeS_4$, $Li_{4.275}Ge_{0.61}Ga_{0.25}S_4$, $Li_{3.25}Ge_{0.25}P_{0.75}S_4$, $Li_{3.4}Si_{0.4}P_{0.6}S_4$, $Li_{2.2}Zn_{0.1}Zr_{0.9}S_3$, $Li_7P_3S_{11}$, $Li_4SnS_4$, $Li_{10}GeP_2S_{12}$, $Li_{10}Ge_{0.95}Si_{0.05}P_2S_{12}$, $Li_{9.54}Si_{1.74}P_{1.44}S_{11.7}Cl_{0.3}$, or the LGPS family such as $Li_{10}GeP_2S_{12}$, $Li_{10+d}M_{1+d}P_{2-d}S_{12}$ (where M is Si4+ or Sn4+), or $Li_{10}Ge_{1-x}Sn_xP_2S_{12}$, or argyrodite crystal system such as, $Li_6PS_5X$ (where X is Cl, Br or I) or $67(0.75Li_2S \cdot 0.25P_2S_5) \cdot 33LiBH_4$, or thiophosphates type such as $Li_4PS_4I$ or $Li_7P_2S_8I$, or layered sulfide such as $Li_{3x}[Li_xSn_{1-x}S_2]$, $Li_2Sn_2S_5$, $Li_2SnS_3$ or $Li_{0.6}[Li_{0.2}Sn_{0.8}S_2]$. The borohydride based solid electrolyte may be $LiBH_4$—LiI (—$LiNH_2$; —$P_2I_4$; —$P_2S_5$).

Excepting for the above-mentioned materials, the polymer solid electrolyte may also be PEO-$Li_x$(where X is $ClO_4$, $PF_6$, $BF_4$, $N(SO_2CF_3)_2$), PEO-$LiCF_3SO_3$, PEO-LiTFSI, PEO-LiTFSI-$Al_2O_3$ Composite solid polymer, PEO-LiTFSI-10% $TiO_2$ Composite solid polymer, PEO-LiTFSI-10% HNT Composite solid polymer, PEO-LiTFSI-10% MMT Composite solid polymer, PEO-LiTFSI-1% LGPS Composite solid polymer, PEO-$LiClO_4$-LAGP, or Poly(ethylene glycol) diacrylate (PEGDA), Poly(ethylene glycol) dimethacrylate (PEGDMA), Poly(ethylene glycol) monomethylether (PEGME), Poly(ethylene glycol) dimethylether (PEGDME), poly[ethylene oxide-co-2-(2-methoxyethoxy) ethyl glycidyl ether] (PEO/MEEGE), Poly(ethyl methacrylate) (PEMA), poly(oxyethylene), poly (cyanoacrylate) (PCA), Polyethylene glycol (PEG), Poly(vinyl alcohol) (PVA), Polyvinyl butyral (PVB), Poly(viny chloride) (PVC), PVC-PEMA, PEO-PMMA, Poly(acrylonitrile-co-methyl methacrylate) P(AN-co-MMA), PVA-PVdF, PAN-PVA, PVC-PEMA, or hyperbranched polymers such as poly[bis(triethylene glycol)benzoate], or polycarbonates such as poly(ethylene oxide-co-ethylene carbonate) (PEOEC), Polyhedral oligomeric silsesquioxane (POSS), Polyethylene carbonate (PEC), poly (propylene carbonate) (PPC), poly(ethyl glycidyl ether carbonate) (P(Et-GEC), poly(t-butyl glycidyl ether carbonate) P(tBu-GEC), or cyclic carbonates such as poly (trimethylene carbonate) (PTMC), or polysiloxane-based such as Poly-dimethylsiloxane (PDMS), poly(dimethyl siloxane-co-ethylene oxide) P(DMS-co-EO), Poly(siloxane-g-ethyleneoxide), or plastic crystal electrolytes (PCEs) such as succinonitrile (SN), PEO/SN, ETPTA/SN, PAN/PVA-CN/SN, or polyesters such as ethylene adipate, ethylene succinate, ethylene malonate, or polynitriles such as polyacrylonitrile (PAN), poly(methacrylonitrile) (PMAN), poly(N-2-cyanoethyl)ethyleneamine (PCEEI), Poly(vinylidenedifluoridehexafluoropropylene) (PvdF-HFP), Poly(vinylidenedifluoride) (PvdF), Poly(ε-caprolactone) (PCL).

The electrolyte with relatively lesser deformation is selected from the solid electrolyte with higher hardness (inherently lower fracture toughness), such as an oxide-based solid electrolyte and its fracture toughness is approximately 1 MPa·m$^{0.5}$). The oxide-based solid electrolyte is a lithium lanthanum zirconium oxide (LLZO) electrolyte or a lithium aluminum titanium phosphate (LATP) electrolyte and their derivatives. Generally, the description of the electrolyte materials with relatively greater deformation or relatively lesser deformation is only for illustration, and is not intended to limit the present invention to these electrolytes with the relatively greater deformation or the relatively lesser deformation. The above-defined relatively greater deformation and relatively lesser deformation refer to the deformation that the electrolytes can be recoverable to the original situation after deforming. For example, if the fragmentation is occurred during deforming, it has to be called irrecoverable. That should not be within the scope of relatively greater deformation and relatively lesser deformation defined in this invention.

When the first mixed electrolyte 14 is selected from a gel electrolyte, a liquid electrolyte, or an ionic liquid, the first mixed electrolyte 14 is extruded by the first active material particles 11 caused by the expansion during the charging and discharging processes. Therefore, the first mixed electrolyte 14 would be slightly extruded from the active material ball 10. When the volume contraction of the first active material particles 11 is occurred, the first mixed electrolyte 14 would be sucked into the active material ball 10. Therefore, during the whole charging and discharging processes, the void will not be occurred and the derived void problems would be happened. When the first mixed electrolyte 14 is a soft solid electrolyte, the squeezed first mixed electrolyte 14 will form a buffer zone due to the elasticity of the soft solid electrolyte. Additionally, if the proportion of the soft solid electrolyte in the first mixed electrolyte 14 is higher, it can also constrain the active material particles 11.

The second mixed electrolyte 24 is disposed outside of the active material balls 10 and filled the gaps between the active material balls 10 to be against the outer surfaces of the active material balls 10. Due to the second mixed electrolyte 24 is mainly composed of an electrolyte with relatively lesser deformation, it can form a resistance to volume expansion of the active material balls 10. When it is configured, the second mixed electrolyte 24 may intersect or partially invade the boundary of the active material balls 10. As shown in figures, the active material balls 10 are only for illustration, and does not limit the boundary thereof is maintained such a complete state. The second mixed electrolyte 24 depicted in the figures is also only for illustration, not to limit its position, size, distribution, etc.

The first mixed electrolyte 14 may also include the electrolyte with relatively lesser deformation, and the second mixed electrolyte 24 may also include the electrolyte with relatively greater deformation, but with different volume contents. For example, the volume content of the electrolyte with relatively greater deformation of the first mixed electrolyte 14 is greater than 50% of the total volume content of the first mixed electrolyte 14, preferably is greater than 90%. The volume content of the electrolyte with relatively lesser deformation of the second mixed electrolyte 24 is greater than 50% of the total volume content of the second mixed electrolyte 24, preferably is greater than 90%.

Therefore, by the different percentages and characteristics configuration of the electrolytes inside and outside the active material balls 10, the expansion resistance can be provided for the active material balls 10. Also, the contact area and condition of the active material particles and the electrolytes are maintained in a better status, and the void problems caused by the huge volume change of the active material particles can be solved.

In order to make the aforementioned active material balls 10 more clear, the following description only illustrates one possible manufacturing process. When the first mixed electrolyte 14 is in liquid, firstly, the active material particles 11, the first electrically conductive material 12 and the first binder (not shown in the figure) are mixed with a solvent and then coated on the temporary substrate. The temporary substrate is removed after successively drying and removing the solvent, and then crushing and using ball milling to obtain the active material balls 10. In the meantime, when the solvent is removed, the holes formed in the active material balls 10 are roughly irregular in shape. The first mixed electrolyte 14 can be filled in the holes.

Since the holes have to be filled with electrolytes, the first mixed electrolyte 14 is mainly composed of the electrolyte with relatively greater deformation to fill the spaces of the holes easily. By the characteristics of soft and deformable, the electrolyte can be deformed according to the size or the shape of the holes. Therefore, the electrolyte can be definitely filled in the holes to ensure the contact state of the first mixed electrolyte 14 and the active materials particles 11. Also, when the first mixed electrolyte 14 is mainly composed of the soft solid electrolyte, the soft solid electrolyte may be mixed directly to the active material particles 11, the first electrically conductive material 12 and the first binder.

The first active material particles 11 is selected a lithium metal, a carbon material, a silicon based materials, such as a silicon and/or a silicon oxide, or a combination thereof, which may have volume change during the electrochemical reactions. The first binder is used to fix their relative positions or can be selected, adjusted or modified according to the characteristics of different active materials to solve the derived problems. For example, in the case of the silicon and/or the silicon oxide as the active materials, in order to control the volume expansion during charging and discharging processes, the first binder mainly includes a cross-linked polymer. The volume content of the cross-linked polymer in the first binder is greater than 70%. Also, with a higher proportion of the first electrically conductive material 12 and the first binder, it can provide sufficient high expansion constraint force and electrical conductivity.

In the conventional electrode layer (in the example where silicon and/or silicon oxide (Si/SiOx) and graphite are directly mixed), the volume content of the electrically conductive material is about 5%, the volume content of the binder is about 7%, and the volume content of the active materials, including silicon and/or silicon oxide (Si/SiOx) and graphite, is about 88%. However, in this invention, the volume content of the first electrically conductive material 12 in the active material balls 10 is 7% to 10%, and the volume content of the first binder in the active material balls 10 is 10% to 15%. Therefore, with a higher amount of the first binder, whose main component is a cross-linked polymer, it can greatly increase the expansion constraint force to effectively control the huge volume change of the silicon material during charging and discharging processes.

The first electrically conductive material 12 may include an artificial graphite, a carbon black, an acetylene black, a graphene, a carbon nanotube, a vapor grown carbon fiber (VGCF) or a combination thereof. The carbon nanotube and the VGCF can not only be used as electrically conductive materials, but also have the ability to absorb electrolyte and elastic deformation. The first binder is mainly a cross-linked polymer with strong physical or chemical adhesion. Therefore, the first binder has less elasticity. For example, the first binder may also have good electron donor with acid group, including polyimide (PI), acrylic resin, epoxy, or a combination thereof. With above-mentioned higher amount of the binder, the first binder with strong rigidity can be used to constraint the active material particles to control the expansion scale of the active material particles after charging and discharging. Therefore, the irrecoverable void zone would be controlled or eliminated.

The higher amount of the rigid first binder and the first electrically conductive material 12 will reduce the bending ability, and also limit to reduce the ratio of the remaining active materials. Therefore, the specific capacity will be reduced. However, the active material ball 10 of the present invention is only served as part of the active materials in the electrode layer structure, there are no such concerns, that is, these defects will not affect the electrode layer structure of this invention, which will be described in detail later.

Please return to FIG. 2, the pre-formed active material balls 10 and the second binder are mixed to form the active material ball electrode layer structure 20. The second binder is different from the first binder. For example, the first binder is mainly composed of the rigid binder to control the volume change of the active material balls 10. Therefore, the elasticity of the first binder is poor. The second binder is selected the binder with good elasticity. Therefore, the elasticity of the second binder is better than the elasticity of the first binder. The second binder is mainly composed of the linear polymer with good elasticity, including Polyvinylidene fluoride (PVDF), Polyvinylidene fluoride-hexafluoropropylene (PVDF-HFP), styrene-butadiene rubber (SBR) and sodium carboxymethyl cellulose (CMC), to maintain the flexibility of the active material ball electrode layer structure 20. The material characteristics of PVDF, PVDF-HFP, SBR have a sponge-like structure that can have a high ability to absorb electrolyte.

The second binder, the second electrically conductive material 22 and the second mixed electrolyte 24 are mixed between the active material balls 10, i.e. outside of the active material balls 10. The second mixed electrolyte 24 is far away from the first active material particles 11 than the first mixed electrolyte 14 of the active material balls 10.

Compared to the requirements of the first mixed electrolyte 14, which emphasizes larger contact surface of the active material particles 11 to obtain high charge transfer, the requirements of the second mixed electrolyte 24, which far away from the active material partides 11, for effective contact area is lesser. Therefore, the second mixed electrolyte 24 is mainly composed of the electrolyte with relatively lesser deformation. In addition to greatly reducing the amount of organic solvent, the gel and the liquid electrolyte, it has better thermal stability and heat dissipation performance to maintain safety continuously. Also, the electrolyte with relatively lesser deformation can constraint the active material balls 10. That means that the electrolyte with relatively lesser deformation, such as a hard solid electrolyte, is used to limit or resist the deterioration of the internal distribution of the active material balls 10 caused by the expansion of the internal active material particles 11, especially the volume shrinkage and expansion during the charging and discharging cycle. Further, due to the requirements for effective contact area is lesser, the electrolyte with relatively lesser deformation can be used to preform the ion conduction to allow the lithium ions to perform high speed and bulk transport between the electrolyte with relatively lesser deformation and the active material balls or between the electrolytes with relatively lesser deformation. The composition of the electrolyte with relatively lesser deformation and the electrolyte with relatively greater deformation can be the same as described above, and the process of forming or filling is also the same, and will not be repeated here.

Figure 3:
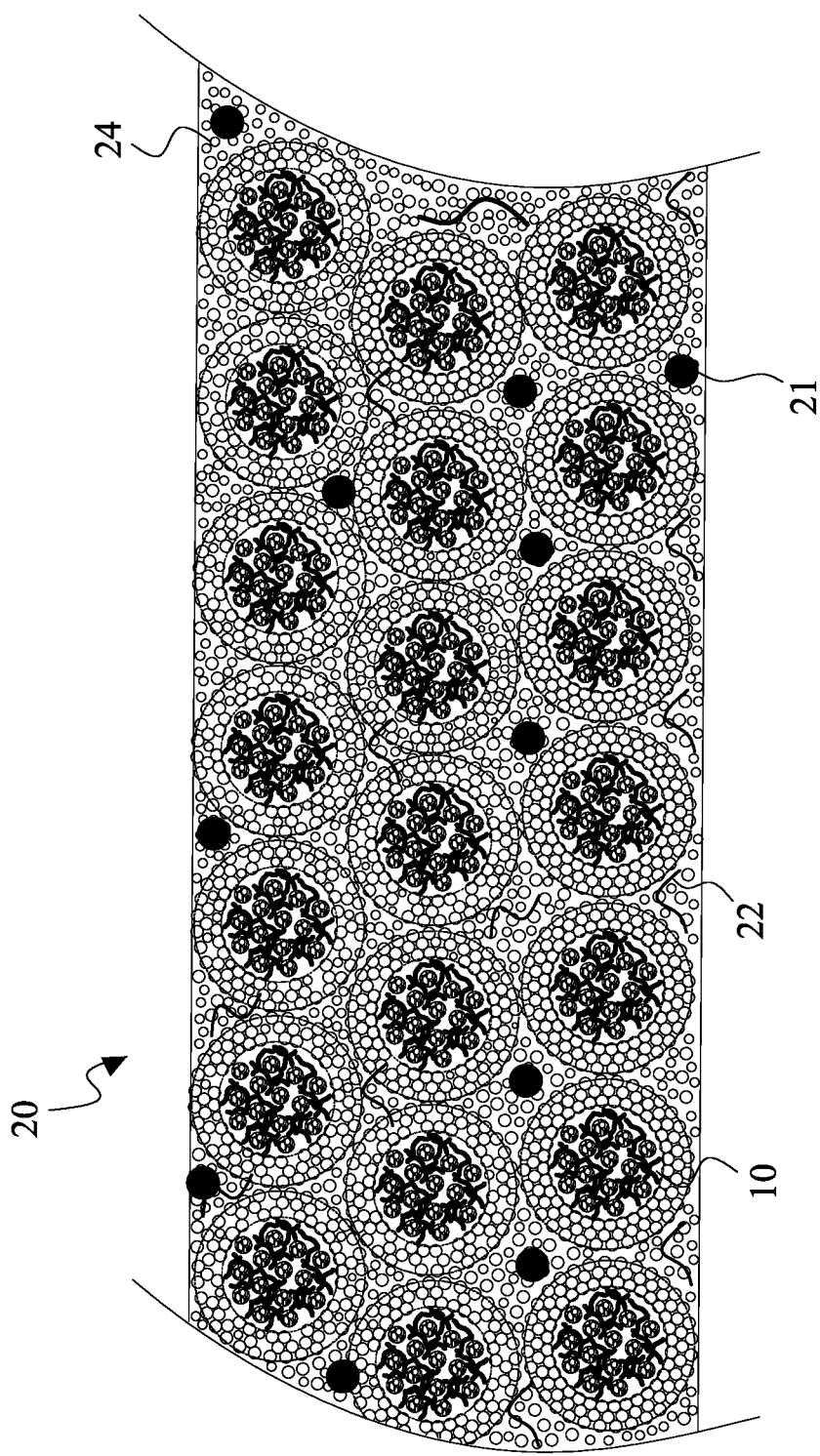
FIG. 3 is a schematic diagram of another embodiment of the active material ball electrode layer structure of this invention.

Please refer to FIG. 3, there have a plurality of second active material particles 21 and the second electrically conductive material 22 disposed among the active material balls 10. The second electrically conductive material 22 may include an artificial graphite, a carbon black, an acetylene black, a graphene, a carbon nanotube, a vapor grown carbon fiber (VGCF) or a combination thereof. The composition of the first electrically conductive material 12 and the second electrically conductive material 22 are the same or different. The second active material particles 21 has to be selected according to the properties of the active material balls 10. The material characteristic of the second active material particles is different from the material characteristic of the first active material particles 11.

Figure 4:
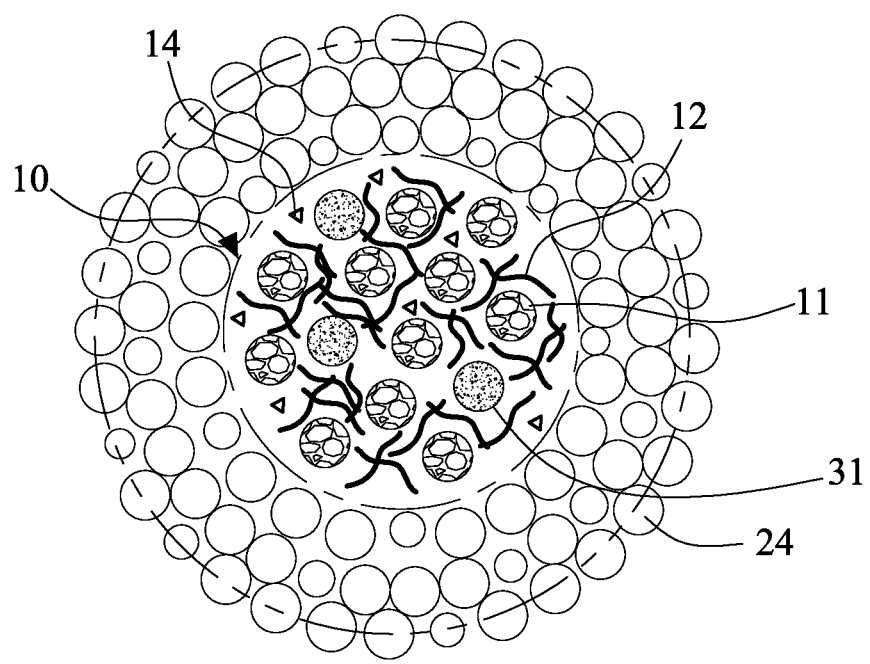
FIG. 4 is a schematic diagram of another embodiment of the active material ball of this invention.

Furthermore, the active material balls 10 may include a plurality of third active material particles 31, showing in FIG. 4, with a material characteristic different from the material characteristic of the first active material particles 11. The composition of the third active material particles 31 and the first third active material particles 11 are the same or different.

Accordingly, this invention discloses an active material ball electrode layer structure, which includes a plurality of active material balls and a second mixed electrolyte, a second electrically conductive material and a second binder located outside the active material balls. The active material ball was preformed. The active material ball includes a first mixed electrolyte, which is mainly composed of the electrolyte with relatively greater deformation. A second mixed electrolyte is mainly composed of the electrolyte with relatively lesser deformation. In this configurations, the high speed transmission outside of the active material balls and multidirectional transmission inside of the active material balls are preformed to achieve a better ion-conduction. Besides, the usage amount of the organic solvent (the gel/liquid electrolyte) are reduced to acquire better thermal performance and maintain safety. Moreover, a first binder composed of the rigid binder is used to form the active material balls and constraint therein, which can effectively control the huge volume change of the silicon material due to the charging and discharging processes or the other derived problems while maintaining the ratio of the electrical conductivity materials and the binder. And the void problems caused by the huge volume change can be solved. The flexibility of the electrode layer can be maintained and improve the specific capacity, electrical conductivity, and ion conductivity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A negative material ball anode layer structure, comprising:
   a plurality of active material balls arranged in layers to form the electrode layer structure, each of the active material balls including a plurality of first active material particles, a first electrically conductive material, a first binder and a first mixed electrolyte including a first electrolyte and a second electrolyte; and
   a second mixed electrolyte including the first electrolyte and the second electrolyte, disposed outside of the active material balls and filling gaps between the active material balls to be against an outer surface of the active material balls to form a resistance of volume expansion of the active material balls;
   wherein the first electrolyte has a deformation ability, and the second electrolyte has a relatively lesser deformation ability compared to the first electrolyte;
   wherein the first active material particles are at least one of a lithium metal, a carbon material, a silicon or a silicon oxide;
   wherein the first electrolyte is at least one of a sulfide-based solid electrolyte, a hydride based solid electrolyte, a halide based solid electrolyte or a polymer solid electrolyte or a combination thereof;
   wherein the second electrolyte is a lithium lanthanum zirconium oxide (LLZO) electrolyte or a lithium aluminum titanium phosphate (LATP) electrolyte;
   wherein a volume content of the second electrolyte of the second mixed electrolyte is greater than 50% of a total volume content of the second mixed electrolyte; and
   wherein a volume content of the first electrolyte of the first mixed electrolyte is greater than 50% of a total volume content of the first mixed electrolyte.

2. The negative material ball anode layer structure of claim 1, wherein the polymer solid electrolyte includes a polyethylene oxide (PEO), a polyvinylidene fluoride (PVDF), a polyacrylonitrile (PAN), a polymethylmethacrylate (PMMA) or a polyvinylchloride (PVC).

3. The negative material ball anode layer structure of claim 1, wherein the volume content of the second electrolyte of the second mixed electrolyte is greater than 90% of the total volume content of the second mixed electrolyte.

4. The negative material ball anode layer structure of claim 1, wherein an average particle diameter D50 of the active material balls is not greater than 70% of a thickness of the electrode layer structure, and the average particle diameter D50 of the first active material particles is not greater than 60% of a diameter of the active material ball.

5. A battery comprising the negative material ball anode layer structure of claim 1, wherein a volume change of the first active material particles during charging and discharging processes is 15% to 400%.

* * * * *